United States Patent [19]

Drucker

[11] 4,246,956
[45] Jan. 27, 1981

[54] CONTROL SCHEME FOR A SOLAR ASSISTED HEAT PUMP

[75] Inventor: Alan S. Drucker, Syracuse, N.Y.
[73] Assignee: Carrier Corporation, Syracuse, N.Y.
[21] Appl. No.: 938,664
[22] Filed: Aug. 31, 1978
[51] Int. Cl.³ .................................................. F25B 13/00
[52] U.S. Cl. ...................................... 165/29; 62/160; 126/437; 237/2 B
[58] Field of Search ................. 165/29, 16; 62/160, 62/2, 324, 156, 238 E; 126/420, 437 X, 428; 237/2 B

[56] References Cited

U.S. PATENT DOCUMENTS

| 3,931,806 | 1/1976 | Hayes | 165/18 X |
| 4,012,920 | 3/1977 | Kirschbaum | 62/2 |
| 4,102,390 | 7/1978 | Harnish et al. | 62/160 |
| 4,119,087 | 10/1978 | Cook | 126/420 |

Primary Examiner—William E. Wayner
Attorney, Agent, or Firm—J. Raymond Curtin; Robert P. Hayter

[57] ABSTRACT

Apparatus for and a method of controlling a combination system utilizing a solar heating system and a heat pump in combination to provide either heated or cooled air to an enclosure. A conventional split system heat pump is mounted such that the indoor coil is located in the same area as the indoor coil of the solar system and optional electric resistance heaters. Heating may be provided from either the solar system by circulating hot water through the indoor solar coil, the heat pump or electric resistance heat, or a combination thereof. Cooling is provided by the heat pump and defrost for the heat pump may involve supplying heat from either the electric resistance heat or the storage tank of the solar system to the indoor coil of the heat pump. In addition, means may be provided for offpeak cooling of stored water.

22 Claims, 8 Drawing Figures

THERMOSTAT ASSEMBLY

FIG. 4

OFF PEAK COOLING ACCESSORY

FIG. 5

OUTDOOR ASSEMBLY
FIG. 6

COMPRESSOR ASSEMBLY
FIG. 7

SOLAR ASSEMBLY
FIG. 8

CONTROL SCHEME FOR A SOLAR ASSISTED HEAT PUMP

BACKGROUND OF THE INVENTION

1. Field of the Invention

This invention relates to air conditioning systems to provide heated and cooled air to enclosures. Particularly the present invention concerns the control scheme for combination heat pump and solar system for use in heating and cooling an enclosure.

2. Prior Art

This control scheme was developed to provide for operation of a combination heat pump and solar heating system. Additional functions such as offpeak cooling (using the heat pump to cool a fluid during hours of reduced electric rates for providing cooling during hours of higher electric rates) are disclosed. Other functions which may be adapted to this sytem that are not included herein, include hot water heating or preheating from the solar system.

Pending patent applications entitled Integral Water-Refrigerant Air Heat Exchanger System, Ser. No. 817,945; Heat Exchanger, Ser. No. 817,946 and Heat Transfer and Storage System, Ser. No. 817,947, have been filed and are assigned to the assignee herein, Carrier Corporation. These three applications concern the use of multiple circuit coils referred to herein as the tri-x coil wherein a plate fin type heat exchanger has two complete circuits contained within it, one for a refrigerant and one for water from the storage tank. Air is passed over or through the coil in heat exchange communication with both of these fluid sources. Likewise, as shown in these pending applications, the tri-x coil need not be a plate fin type heat exchanger, but merely a heat exchanger capable of transferring heat between the three fluids, i.e., refrigerant, water and air.

Heat pump controls are known and have been disclosed in the art for many years. It is a combination system of heat pump controls and solar system controls that constitute the invention described herein.

BRIEF SUMMARY OF THE INVENTION

It is an object of the invention to provide a control system for a combination heat pump and solar system.

It is a further object of the present invention to provide a control scheme which provides for heating from hot water storage, a heat pump, or electric resistance heat.

It is yet another object of the present invention to provide for a combination heat pump and solar system heating system which can provide either cooling or heating to an enclosure.

It is a further object of the present invention to provide an energy efficient system for heating and cooling an enclosure.

It is still another object of the present invention to provide relays and contacts which operate in an electric circuit to prevent electric resistance heat from operating when there is hot water available from storage of the solar system to provide heating to the enclosure or heating for defrost purposes.

It is a still further object of the present invention to provide a safe, economical, reliable and easy to manufacture control system for regulating the operation of a combination heat pump and solar assisted heating system.

Other objectives will be apparent from the description to follow in the appended claims.

The above objects are achieved according to a preferred embodiment of the invention by the provision of a control circuit for a solar assisted heat pump system for heating and cooling an enclosure, said system having solar collectors, a storage tank, a heat pump system with an indoor coil, outdoor coil and compressor, and an indoor solar coil in communication with the fluid in the storage tank, electric resistance heaters, reversing valve for reversing operation of the heat pump and a thermostat. A pump is provided for circulating heat exchange fluid between the solar collectors and water storage tank. A second pump is provided for circulating the water in the tank with the indoor solar coil. A heat pump, connected such that the indoor heat pump coil is located in heat transfer relation with the indoor solar coil provides for the transfer of heat energy between the solar system and the heat pump system. Various temperature sensing devices and electrical circuits are further provided to ascertain whether or not there is sufficient heat stored in the solar system to provide heating to the enclosure and whether or not the heat pump should be operated simultaneously therewith. A further device is used to ascertain whether eletric heat is necessary to provide heating to the enclosure and whether or not a combination of these elements should be utilized. Additional temperature sensing devices are used to ascertain when a defrost cycle is necessary for the heat pump as the unit operates on the cooling cycle and whether or not heated fluid from the solar system should be used to provide heat to the heat pump for this purpose. A freeze protector is provided such that the second pump is operated to prevent ice from forming on indoor solar coil under particular circumstances. A temperature differential detector is utilized to ascertain whether there is sufficient heat available in the solar collectors to supply heat to the water stored in the water storage tank. The control system as described provides numerous relay contacts to individually select the appropriate operation of the various components for conditioning the enclosure under varying weather conditions.

DETAILED DESCRIPTION OF THE PREFERRED EMBODIMENT

This control circuit provides for heating from either the solar system, the heat pump, or electric resistance heat or a combination thereof. Electric resistance heat as used herein shall include all types of supplemental heat including gas and oil fired furnaces. Cooling may be supplied either from the heat pump or from the water from the solar system that has previously been cooled by the heat pump. Defrost operation is provided such that refrigerant flow through the heat pump is reversed in the conventional manner and such that heat is supplied to the enclosure and/or to the indoor coil of the heat pump for defrost from either the electrical resistance heaters or the water storage tank. Other additional functions may be incorporated within the system without changing the scope of the invention herein such as domestic water preheat or other use of the solar system for heating within the enclosure. The preferred embodiment as described herein may be utilized in other types of combination heat pump and solar systems and is not limited in scope to the particular system described herein. Furthermore, the operation and location of the various indoor and outdoor units, thermostat and the compressor may be altered without substantially affecting the spirit and the scope of the invention herein.

Figure 2:
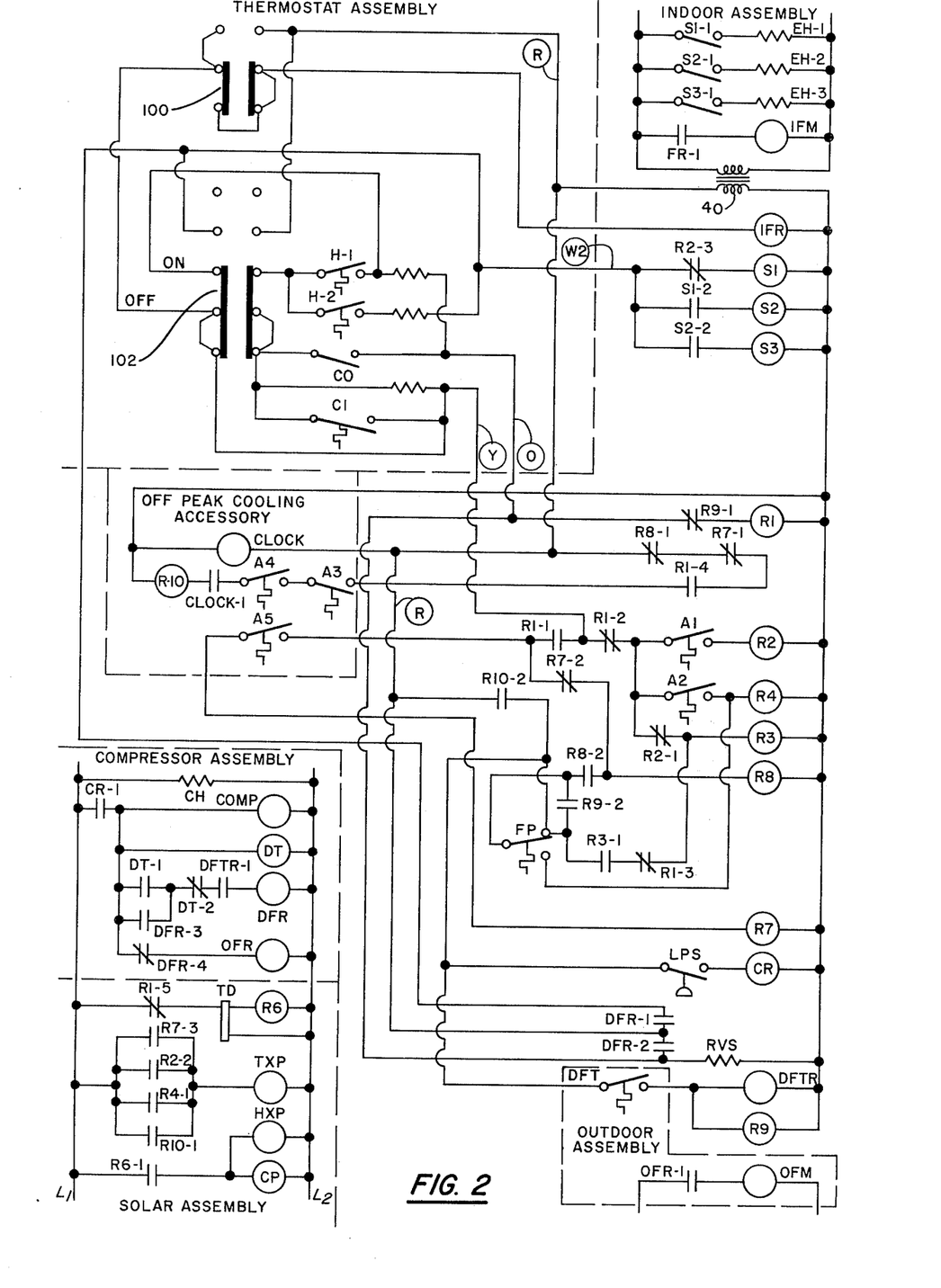
FIG. 2 is a schematic wiring diagram of the control circuit for the combination solar and heat pump air conditioning system.

FIG. 2 is a schematic wiring diagram of the overall control circuit. FIGS. 3-8 are enlarged portions of FIG. 2 each showing a section thereof. Interconnecting wires between FIGS. 3-8 are labelled by letters A—M on the various figures.

Figure 1:
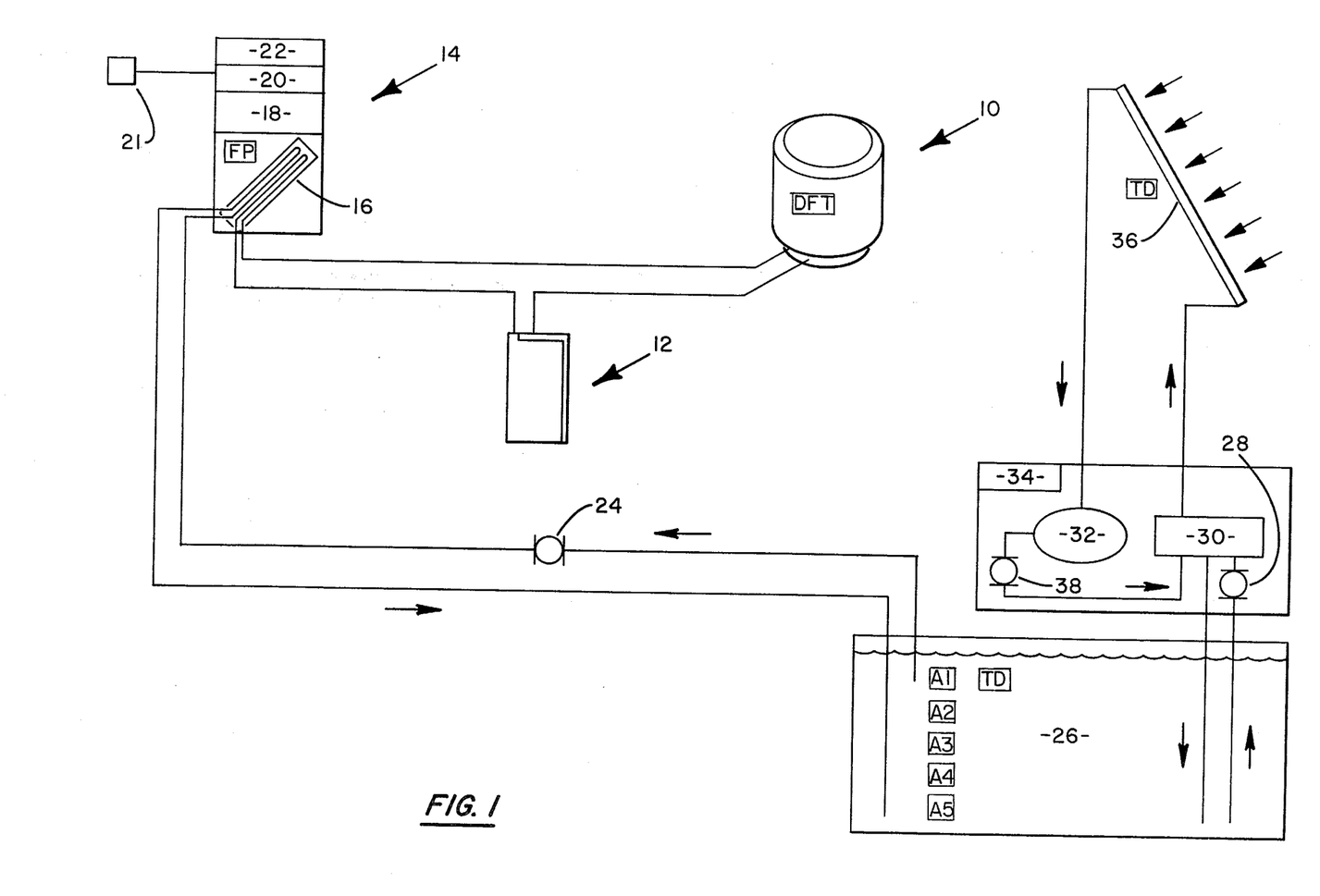
FIG. 1 is a diagrammatic view of a combination solar and heat pump air conditioning system.

Referring now to FIG. 1, it can be seen that there is a combination solar and heat pump air conditioning system. Solar collectors 36 act to heat the fluid contained therein usually glycol or water under the appropriate sunlight conditions. This fluid is then circulated through a reservoir 32 by collector pump 38 to heat exchanger 30 and then back to the solar collectors 36. Controls 34 regulate this operation. Heat exchanger 30 is in fluid communication with water storage tank 26 and heat exchanger pump 28 acts to circulate the water therebetween. Consequently, heated fluid from the solar collectors is supplied to heat exchanger 30 where it gives off heat to the water stored in the water storage tank 26. Consequently, the heat from the solar collectors is transferred to the water in the storage tank. This system as described provides for the use of glycol or some other fluid which is not subject to freezing in the solar collection system. Consequently the heat exchange 30 and collector pump 38 as well as reservoir 32 are necessary such that an independent glycol system may be maintained in heat exchange relationship with the water storage tank. If water were used as the heat exchange fluid in the collectors as well as the tank, a single pump would be sufficient to circulate water between the tank and the collectors. Furthermore using appropriate valving or single pump could be used to circulate the water from the tank to the indoor solar coil as well as between the collectors and the tank.

A heat pump system comprising indoor coil assembly 16 as part of the tri-x coil, heat pump compressor section 12 and outdoor coil 10 is shown. The compressor reversing valve of the heat pump system (not shown) is located within the heat pump compressor section 12. The outdoor coil and outdoor fan are located within outdoor coil assembly 10. Indoor coil of the refrigerant system is part of the tri-x coil 16. During heating operation via the heat pump, the indoor coil acts as the condenser of the refrigeration system as is well known in the art supplying heat to the air passing thereover and the outdoor coil acts as an evaporator removing heat from the outdoor air in communication therewith. During cooling the functions are reversed by the reversing valve such that the outdoor coil discharges heat into the atmosphere and the indoor coil absorbs heat from the indoor air in communication therewith.

Tri-x pump 24 is used to circulate water between the water storage tank 26 and the indoor solar coil part of the tri-x coil 16. Consequently, hot or cold water in the storage tank may be supplied to the tri-x coil in communication with the indoor or enclosure air being circulated therethrough.

As a part of the indoor unit 14 in addition to tri-x coil 16 there is indoor fan 18 mounted to circulate air from the enclosure through the indoor unit. Controls 20 connected to thermostat 21 are provided for synchronizing operation of the combination solar and heat pump system. Electric heaters 22 are further shown in communication with the indoor air passing through indoor section 14 such that they may be utilized to transfer heat energy to that air.

The combination solar and heat pump system as shown may be utilized in several operational modes. When sufficient heat is available from the solar collection system the water storage tank reaches a predetermined temperature level and heating for the enclosure is supplied solely through the indoor solar coil by the hot water from the storage tank. When there is insufficient heat available in the water storage tank to supply the needs of the enclosure, but at the same time the temperature of the water in the tank is high enough to meet a portion of the heating load on the enclosure, then the tri-x pump 24 is operated to supply that heated water to the indoor solar coil and simultaneously heat pump 11 is operated in the heating mode to supply heat to the indoor heat pump coil. The combination of these two should then be sufficient to supply heating to the enclosure.

If the temperature of the water in the water storage tank is insufficient to supply heating to the enclosure, then heat pump 11 may be operated solely to supply that heating. If the heat pump is incapable of meeting the need then supplemental heat shown as electric resistance heat is additionally energized to supply the necessary heating.

In the cooling mode of operation the heat pump operation is reversed and heat is removed from the indoor air at the indoor coil of the heat pump system. Cooling may also be accomplished by circulation of cool water from the water storage tank to the indoor solar coil such that heat is absorbed by the cooled water from the water storage tank. This water in the water storage tank has been precooled during off-peak hours by the heat pump system being operated in the cooling mode absorbing heat from the water at the tri-x coil.

Additionally during certain atmospheric conditions, the heat pump will form frost or ice on the outdoor heat exchanger as it functions to provide hot gaseous refrigerant to coil 16. In this event it is necessary to defrost the heat exchanger to provide for efficient heat transfer between the refrigerant and the ambient air in communication therewith. During defrost the heat pump operation is switched from heating to cooling such that heat is transferred from the indoor coil to the outdoor coil where it is used to melt the ice. During defrost heat is absorbed from the air in the enclosure acting to cool the air even though heating is required by the enclosure. Consequently available hot water from the storage tank may be circulated to the indoor solar coil to provide both a source of heat for the indoor heat pump coil and to heat the indoor air. Additionally, electric resistance heat may be utilized to heat the indoor air such that warm air and not cold air is returned to the enclosure. After defrost is completed, the heat pump returns to the heating operation and the electric resistance heat or the solar indoor coil operation are typically discontinued. Additional functions such as domestic water preheat utilizing solar hot water heat adaptable to the system described herein have not been included for the sake of simplicity.

Referring now to FIG. 2, a schematic wiring diagram of the control system, there can be seen the various components and connections of the control system. Dotted lines are shown to indicate the thermostat, the off-peak cooling accessory, the compressor section, the outdoor coil section, the solar control section and the indoor controls in general. Line voltage is supplied to the indoor coil unit at L1 and L2. Connected therebetween are relay contacts S1-1, S2-1 and S3-1, each relay is connected to an electric heater; electric heater 1, electric heater 2 and electric heater 3 such that each relay may bring on an additional electric resistance heater. Also connected between L1 and L2 are normally open fan relay contacts FR-1 and the indoor fan motor. Transformer 40 is also shown such that line voltage, typically 230 Volts is reduced to 24 Volts for the control circuitry. This 24 Volt current is then supplied directly to the thermostat and to other points shown in the wiring diagram. At the thermostat the fan switch 100 may be located to energize the indoor fan relay IFR which closes contacts FR-1 and energizes the indoor fan motor. Also shown in selector switch 102 for presetting various types of operation of the system. The thermostat has two stages of heating and cooling. In the heating mode of operation temperature sensor switch H1 closes upon heating need being sensed. H1 is connected thru the selector switch to the Y series of wires including normally closed contacts R1-2 and to normally open contacts R1-1. Upon the second stage of heating being detected the H2 thermal sensing device closes. The H2 thermal sensing device is connected to the W2 wire which is connected to the normally closed R2-3 contacts which are connected to the S1 relay. The H2 thermal sensing device is also connected to the normally open S1-2 contacts which are connected to relay S2 and to normally open S2-2 contacts which are connected to relay S3. Thermal sensing device H2 is also connected to the emergency heating wire W2 which is connected to the normally open defrost relay DFR-1 contacts.

Upon the thermostat being placed in the cooling mode, wire O is energized when thermal sensing device CO is closed. Wire O is connected to the reversing valve for operating the heat pump in the cooling mode of operation. When additional cooling need is necessary temperature sensitive device C1 senses that need and energizes wire Y. Wire Y is connected to normally open contacts R1-1 and normally closed contacts R1-2. In addition thereto wire Y is connected to normally open defrost thermostat DFT.

In reference to the application of power to the system it is to be understood that power from transformer 40 is provided through wire R to fan switch 100. Just prior to fan switch 100 an extension of wire R extends downwardly to system switch 102. The system switch 102 is shown having two slide bars which may be moved to connect the various wires. The slide bars as shown are in the off position and there is no connection made to wire R. When the unit is placed in the on position the slide bars are moved upwardly one position such that the right hand slide bar of the system switch engages the terminal connected to wire R. Hence, power is supplied from wire R to both H-1 and H-2 thermostats and to the $C_0$ and $C_1$ thermostats. In this position, when a heating need is sensed, the H-1 thermostat may close energizing wire Y. When second stage heating is required, H-2 closes energizing wire W-2 which brings on the electric resistance heat. In the cooling mode, upon high temperature being sensed, thermostat $C_0$ closes energizing wire 0 which energizes the reversing valve to switch modes to heating. When an additional rise in temperature occurs, thermostat $C_1$ closes energizing wire Y which engages the compressor of the refrigeration machine.

The "on" and "off" positions of system switch 102 refer to the switch being in the off position as shown when it is not connected to wire R and upon the switch being moved upwardly one position being engaged to wire R and hence being in the on position.

Figure 3:
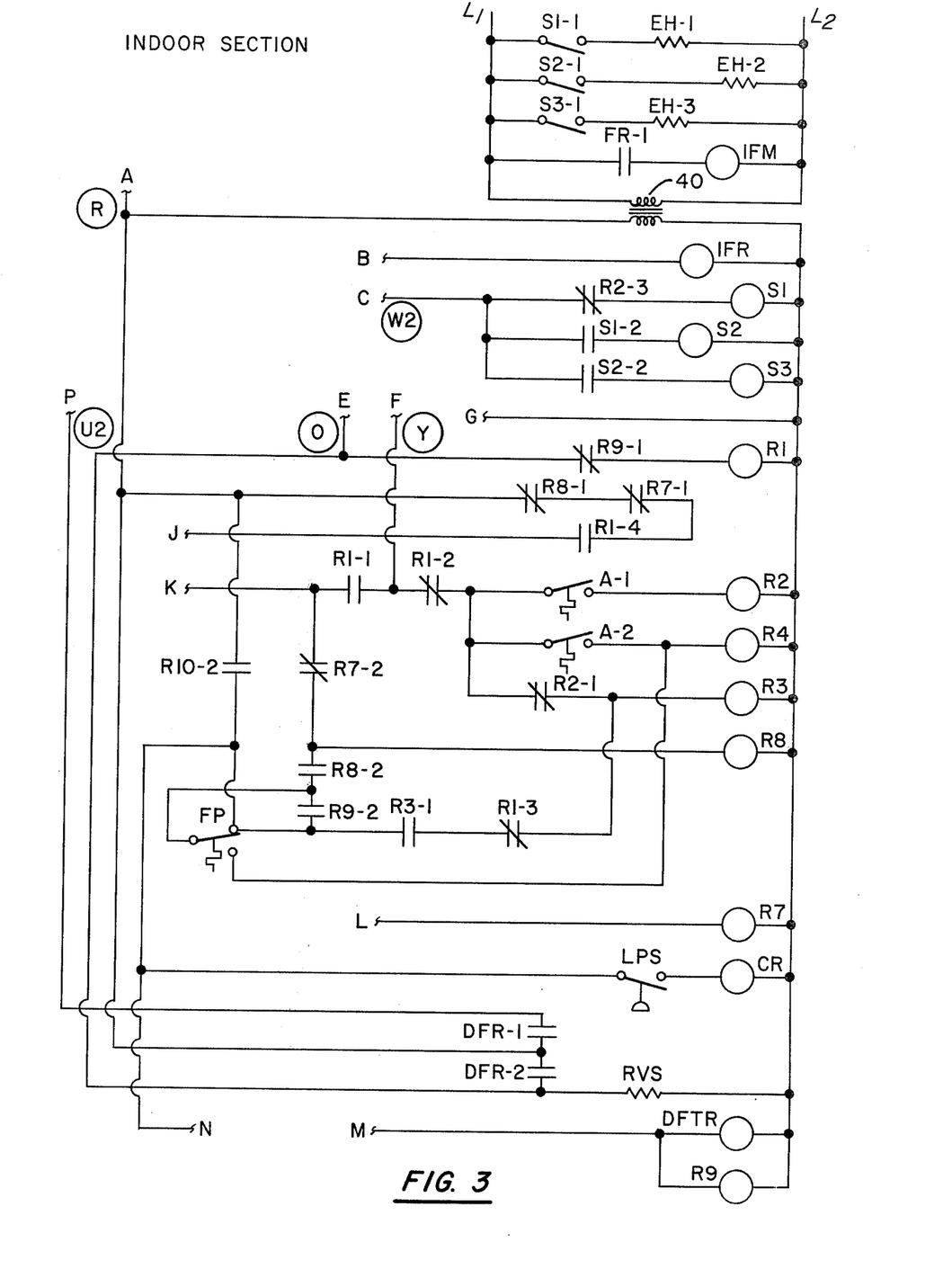
FIG. 3 is a schematic wiring diagram of the indoor section of the wiring diagram of FIG. 2.
Figure 4:
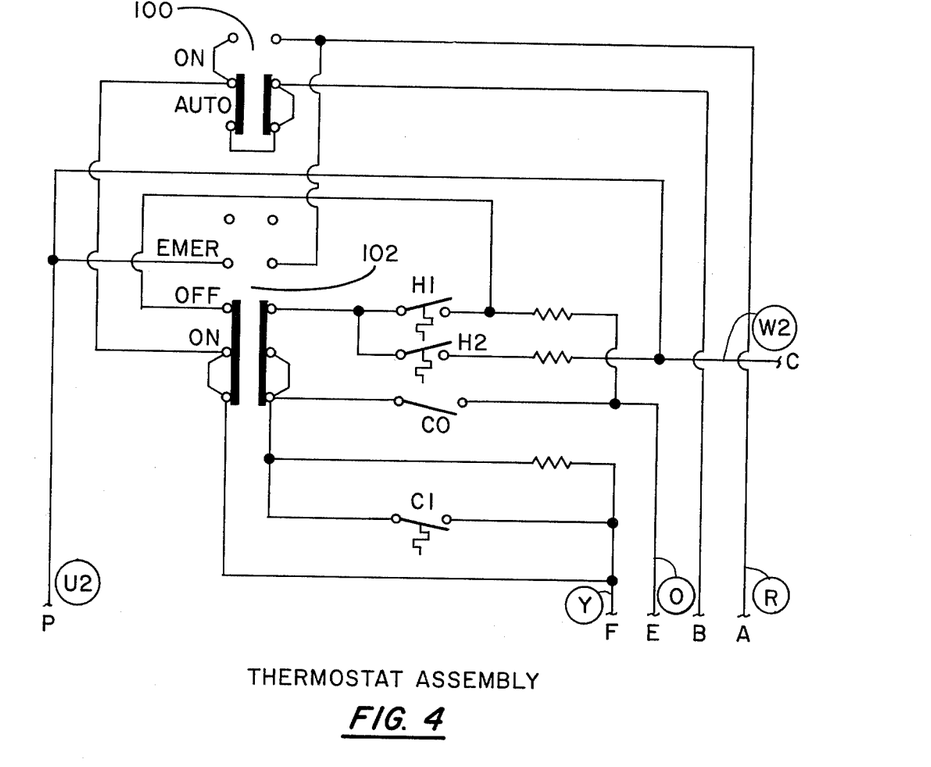
FIG. 4 is a schematic wiring diagram of the thermostat section of the wiring diagram of FIG. 2.

In the indoor section of the unit wire O is connected to normally closed contacts R9-1 which are connected to relay R1. Wire R is connected to normally closed contacts R8-1 which are connected to normally closed contacts R7-1 which are connected to normally open contacts R1-4 which are connected to aquastat A3 in the off-peak cooling accessory.

Within the indoor section wire Y is connected to normally closed contacts R1-2 which are connected to aquastat A-1 which is connected to relay R2. Normally closed contacts R1-2 are also connected to aquastat A2 which is connected to relay R4 and normally closed contacts R2-1 which are connected to relay R3. Normally open contacts R1-1 are connected to aquastat A5 in the off-peak cooling accessory and to normally closed contacts R7-2. The R7-2 contacts are connected to relay R8 and to normally open contacts R8-2 which are connected to one end of the freeze protector FP and to normally open contacts R9-2. The freeze protector in a normally closed position is connected to the normally open R10-2 contacts which are connected to the R wire, to the normally open R9-2 contacts and to the normally open R3-1 contacts which are connected to the normally closed R1-3 contacts which are connected to the normally closed R2-1 contacts and relay R3. The terminal of the freeze protector which is only contacted when there is danger of freezing is connected to the R4 relay and the A2 aquastat.

Continuing within the indoor section wire R is connected through the normally open DFR-1 contacts to the W2 wire which is connected to the normally closed R2-3 contacts, the normally open S1-2 contacts and normally open S2-2 contacts. Wire R is also connected to the normally open DFR-2 contacts which are connected to the reversing valve solenoid.

Figure 6:
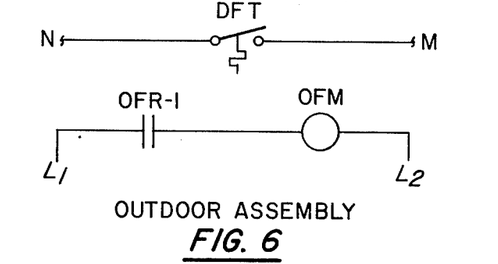
FIG. 6 is a schematic wiring diagram of the outdoor section of the wiring diagram of FIG. 2.

The wire connected to the low pressure swith is also connected through the normally open defrost thermostat DFT to the defrost thermostat relay DFTR and the R9 relay. The outdoor coil has a defrost thermostat mounted therein to sense the temperature of the outdoor coil and in addition thereto has outdoor fan relay contacts OFR-1 connected to the outdoor fan motor OFM such that upon the outdoor fan relay being closed the outdoor fan motor will be operated. Line voltage is supplied to the outdoor coil through L1 and L2.

Figure 5:
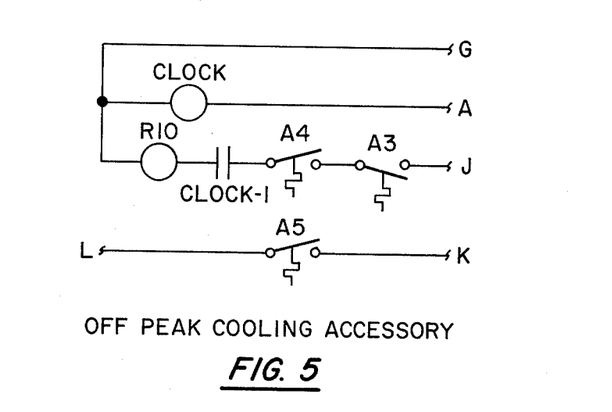
FIG. 5 is a schematic wiring diagram of the off peak cooling accessory of the wiring diagram of FIG. 2.

The off-peak cooling accessory has various connections to the indoor section. A clock is connected to wire R of the indoor section and back to common for continuous operation. Aquastat A3 is connected to normally open relay contacts R1-4 and to aquastat A4 which is connected to clock contacts clock-1 and to relay R10 which is connected back to common. Additionally within the off-peak cooling accessory aquastat A5 is connected between normally closed relay contacts R7-2 and normally open relay contacts R1-1 and relay R7.

Figure 7:
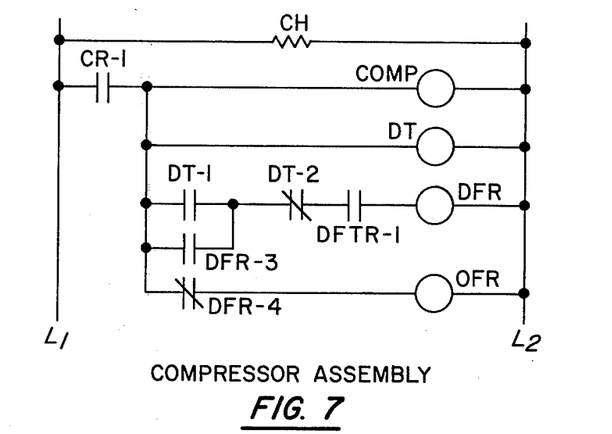
FIG. 7 is a schematic wiring diagram of the compressor section of the wiring diagram of FIG. 2.

Within the compressor section line voltage is supplied thru L1 and L2 to crank case heater CH and to compressor motor COMP through normally open compressor relay contacts CR-1. In addition defrost timer DT is connected to normally open compressor relay contacts CR-1 and the compressor motor, to normally open defrost timer contacts DT-1, to normally open defrost relay contacts DFR-3, to normally closed defrost delay contacts DFR-4 and therethrough to the outdoor fan relay OFR. Defrost timer contacts DT-1 are connected to normally closed defrost timer contacts DT-2 which are connected to the defrost relay contacts DFTR-1 in the normally open position which are connected to the defrost relay DFR. Normally open defrost relay contacts DFR-3 are connected to normally closed defrost relay contacts DFR-4, to normally open defrost timer contacts DT-1 and normally closed defrost timer contacts DT-2.

Figure 8:
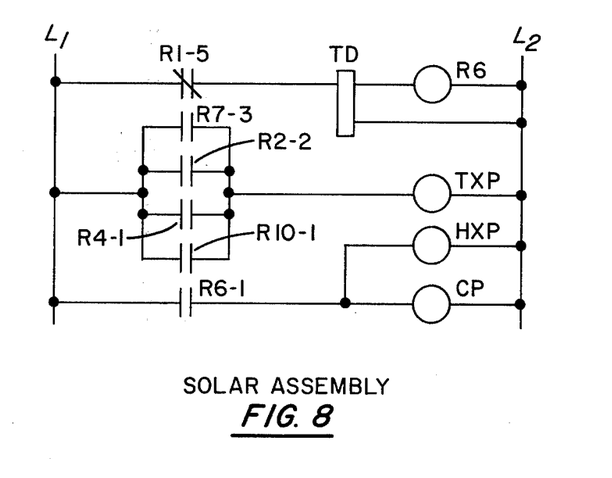
FIG. 8 is a schematic wiring diagram of the solar section of the wiring diagram of FIG. 2.

Line voltage is supplied to the solar section of the unit through L1 and L2. Therein relay contacts R1-5 in the normally closed position are connected to temperature differential controller TD which is connected to common and relay R6. In addition, normally open relay contacts R7-3, R2-2, R4-1, and R10-1 are all connected in parallel to the tri-x pump motor TXP such that upon any of these sets of contacts being closed the tri-x pump will be operated. Also contained therein are normally open relay contacts R6-1 which are connected to both the heat exchanger pump motor HXP and the collector pump motor CP such that upon relay R6 being energized both the heat exchange pump and collector pump are operated.

OPERATION

When the thermostat is placed in the cooling mode, wire O is energized when thermal sensing device CO is closed. Current is then supplied through normally closed contacts R9-1 to relay R1. Current is also supplied to normally open defrost relay contacts DRF-2 and the reversing valve solenoid RVS such that the reversing valve is energized to be in the cooling mode of operation. Upon further rise in the indoor temperature, cooling thermostat switch C1 closes and the wire designated Y is energized. Since relay R1 is energized the normally closed R1-2 contacts are open and the contacts R1-1 are closed. If relay R7 is not energized indicating that the fluid in the storage tank is not below the temperature level sensed by temperature sensing device A5, typically 60°, then the normally closed contacts R7-2 remain closed and relay R8 is energized. Once relay R8 is energized the normally open R8-2 contacts are closed such that there is current flow through the freeze protector FP. Wire Y then energizes the compressor relay CR through low pressure switch LPS such that the compressor relay contacts CR-1 are closed and the compressor motor is energized. Consequently the unit will operate the heat pump in the cooling mode of operation. The indoor fan will be operated through the fan switch and indoor fan relay IFR which operates to close the normally open fan relay contacts FR-1 connected to the fan motor.

If off peak cooling has been utilized and cold water is stored within the storage tank then temperature sensing device AS which would normally close at about 60° F. will act to energize relay R7 through normally open contacts R1-1. Since the R1-1 contacts are closed upon the first stage cooling being sensed R7 is energized. When the R7 relay is energized the normally closed R7-2 contacts open preventing relay R8 from being energized. When the R7 relay is energized the normally open R7-3 contacts are closed, energizing the tri-x pump such that the cold water from the storage tank is circulated to the indoor solar coil for providing cooling to the enclosure.

In the heating mode of operation upon a drop in the temperature of the air in the enclosure within the temperature sensing device H1 closes energizing wire Y. Since wire O is not energized relay R1 is not energized consequently normally open relay contacts R1-1 remain open and normally closed relay contacts R1-2 remain closed. If the A1 temperature sensing device senses the temperature in the fluid storage tank in excess of a predetermined level, for example 120°, then relay R2 is energized through the normally closed R1-2 contacts. Once relay R2 is energized, normally closed relay contacts R2-3 open preventing electrical resistance heat operation and normally open contacts R2-2 are closed commencing tri-x pump operation. Should the temperature of the fluid storage medium be below the predetermined level of the A1 temperature sensing device then the normally closed R2-1 contacts remain closed and relay R3 is energized.

Once relay R3 is energized current may flow from the normally closed R2-1 contacts through the normally closed R1-3 contacts through the now closed but normally open R3-1 contacts to the compressor relay to bring on the compressor in the heating mode of operation. Wire O is not energized consequently the reversing valve solenoid is in heating position for the mode of operation for the heat pump. At the same time if the temperature level in the fluid storage tank as determined by the temperature sensing device A2 is above a second predetermined level, i.e. 90°, then R4 is energized. When relay R4 is energized normally open R4-1 contacts are closed and the tri-x pump is brought into operation.

Should the above combination hot water storage and heat pump heating be incapable of maintaining the enclosure at the desired temperature level, then the temperature in the conditioned area continues to drop until temperature sensing device H2 closes. Upon temperature sensing device H2 being closed wire W2 is energized and electric resistance heat is brought on in sequence to meet the load on the enclosure. The electrical resistance heaters will not be energized if the R2-3 contacts in the normally closed positioned are opened by relay R2 being energized indicating hot water is available at a temperature above the first predetermined temperature level. If this water is not available then the R2-3 contacts will remain closed and sequence relay S1 will be closed. Once sequence relay S1 is closed, the S1-1 contacts close energizing electric heater EH1. After a predetermined time if heating is still being called for by temperature sensing device H2 then sequence relay S1 trips normally open S1-2 contacts which energize sequence relay S2. At that time the S2-1 contacts close energizing electrical heater EH2. If the H2 sensing device continues to remain open then sequence relay S2 closes and the S2-2 contacts close, energizing sequence relay S3. Sequence relay S3 then closes contacts S3-1 and electrical resistance heater EH3 is brought on line to meet the heating demand.

For off peak cooling power is supplied from the transformer T1 through wire R to the clock which is connected to common such that the clock will be energized continuously. Power is also supplied through normally closed contacts R8-1 which will open if the relay R8 is energized indicating a present cooling need, through the normally closed contacts R7-1 which will open if there is a cooling need sensed and the temperature of the fluid in the tank is below a predetermined level, i.e. 60°, and through normally open R1-4 contacts which will close only upon a cooling demand being sensed. If the cooling demand is sensed, and the R8-1 contacts and the R7-1 contacts are closed, then power is supplied to temperature sensing device A3 which serves as a safety device to discontinue offpeak cooling operation if the temperature of the water in the storage tank falls below 35° F. If the temperature in the storage tank is below 35° no additional cooling can be provided. If it is above 35° and the various contacts as well as aquastat A3 are closed then current is then supplied to temperature sensing device A4. Temperature sensing device A4 is preset to open at a predetermined temperature such as 130° such that when the fluid in the storage tank is heated the system will then not operate in the offpeak cooling mode. Clock contacts Clock-1 are connected to temperature sensing device A4 and to relay R10 such that relay R10 may be energized at the appropriate offpeak time intervals if temperature sensing devices A3 and A4 are closed. Relay R10, when energized, closes contacts R10-1 which operate the tri-x pump and closes contacts R10-2 which provide power to the freeze protector FP. When temperature sensing device A5 senses the presence of a cooled body of fluid in the fluid storage tank i.e., below 60° F., then cooling to the enclosure may be supplied by energizing relay R7 thru temperature sensing device A5.

Freeze protector FP is provided such that the fluid from the fluid storage tank will not be frozen in the indoor solar coil. If the temperature of the indoor solar coil gets below a predetermined level such as 35° F. then the freeze protector energizes relay R4 which operates the tri-x pump to circulate water through the indoor solar coil and compressor operation is terminated if the unit is in the cooling mode of operation.

For defrost operation a defrost timer is located in the compressor section such that periodically the DT-1 defrost timer contacts are closed and the DT-2 defrost timer contacts are also closed for a short period of time such that if the defrost thermostat relay contacts are closed by the defrost thermostat relay being energized, then the defrost relay will be energized. If the defrost relay is energized then the DFR-3 normally open contacts are closed and the DFR-4 normally closed contacts will open and the outdoor fan relay may not be operated. Once the outdoor fan relay is de-energized, the outdoor fan motor cannot operate during defrost. A defrost thermostat DFT is located adjacent the outdoor coil such that when the compressor is being operated wire Y supplies power to the defrost thermostat. If the defrost thermostat closes then defrost thermostat relay DFTR and R9 are energized. The defrost timer acts to energize the defrost relay if the defrost thermostat relay is energized during the period that defrost timer contacts DT1 and DT2 are both closed. After a predetermined time interval the defrost timer DT opens normally closed contacts DT-2 such that the circuit formed from the closed compressor relay contacts CR-1 through the now closed DFR-3 contacts through the normally closed DT-2 contacts through the now closed DFTR-1 contacts to the defrost relay is broken. During defrost the DFR-1 and DFR-2 contacts are closed. The closing of the DFR-2 contacts acts to energize the reversing valve solenoid RVS such that the unit is operated in the cooling mode of operation to supply heat to the outdoor heat exchanger from the indoor heat exchanger. The closing of the DFR-1 contacts operates to energize the electrical resistance heaters to supply heat to the enclosure to be cooled. Of course, the electrical resistance heaters will not be energized if there is sufficient heat available in the hot water tank such that relay R2 is energized. Since the system is in the heating mode relay R2 will remain energized if there is sufficient heat available in the hot water tank and consequently contacts R2-2 will remain closed energizing the tri-X pump to provide hot water to the indoor solar coil.

The heat exchanger pump and collector pump which operate to transfer heat between the solar collector and fluid storage tank are energized when relay R6 is energized closing normally open relay contacts R6-1. A temperature differential controller TD is connected through normally closed relay contacts R1-5 such that relay R6 is energized when the temperature differential between the temperature of the fluid in the solar collector and the fluid in the fluid storage tank exceeds a predetermined level. A typical differential for operation might be 20° F. By the provision of normally closed R1-5 contacts before the temperature differential device the heat exchanger and collector pump may not be operated if the unit is in the cooling mode of operation. Consequently hot water from the collectors cannot be mixed with cold water in the storage tank generated during off peak cooling.

The circuit and apparatus of the herein described invention have been pointed out in particular and with detail. It is well within the scope of the present invention to modify this control circuit to meet the various peculiarities of a control system designed to regulate a heat pump and solar system to provide heating and cooling to an enclosure. Modifications and variations can be made within the spirit and scope of the herein invention.

What is claimed is:

1. A control means for operating a solar assisted heat pump system for heating and cooling an enclosure which comprises:

solar collector means for heating a heat exchange fluid with solar energy;

a storage tank serving as reservoir for the heat exchange fluid;

an indoor solar coil for transferring heat to or from the heat exchanger fluid;

a heat pump system of the reversible type for circulating a refrigerant having an outdoor coil in heat exchange communication with the solar indoor coil, a compressor, an outdoor coil and means for reversing the direction of flow of the refrigerant through the coil;

means for circulating the heat exchange fluid between the solar collector means, storage tank and the indoor solar coil; and control means having a thermostat for regulating the operation of the solar system heat pump system which further comprises:

(a) heating means for supplying heat on demand from the thermostat to the enclosure by either circulating heat exchange fluid to the indoor solar coil or energizing the heat pump in the heating mode of operation to supply refrigerant to the indoor heat pump coil or a combination thereof;

(b) cooling means for energizing the heat pump to remove heat from the enclosure upon demand from the thermostat;

(c) defrost means for supplying heat to the outdoor heat pump coil by operating the heat pump in the cooling mode of operation, the indoor solar coil being used to supply heat to the indoor heat pump coil under the appropriate temperature conditions;

(d) freeze protector means for operating the means for circulating heat exchange fluid through the indoor solar coil to prevent the heat exchange fluid from freezing therein; and (e) temperature differential means for operating the means for circulating the heat exchange fluid between the solar collector means and storage tank when the temperature of the heat exchange fluid in the solar collector means is greater than the temperature of the heat exchange fluid in the storage tank.

2. The apparatus as set forth in claim 1 and further including supplemental heating means and wherein as a part of the control means the heating means supplying heat on demand from the thermostat includes energization of the supplemental heating means under the appropriate conditions; wherein the defrost means may include energization of the supplemental heating means under the appropriate conditions and further including lockout means to prevent the energization of the supplemental heating means when the heat exchange fluid in the storage tank contains sufficient heat to condition the enclosure.

3. The apparatus as set forth in claim 2 wherein the supplemental means comprises electric resistance heaters.

4. The apparatus as set forth in claim 1 wherein the control means further comprises off peak cooling means for cooling the heat exchange fluid in the indoor solar coil with the heat pump system and storing the cooled heat exchange fluid in the reservoir to provide cooling at a subsequent time by circulating the then cooled heat exchange fluid through the indoor solar coil.

5. The apparatus as set forth in claim 2 wherein the heating means of the control means includes:

a first temperature sensitive device for activating the means for circulating the heat exchange fluid between the indoor solar coil and the storage tank when the temperature of the heat exchange fluid in the storage tank is above a first predetermined level;

a second temperature sensitive device for activating the means for circulating the heat exchange fluid between the indoor solar coil and the storage tank when the temperature of the heat exchange fluid in the storage tank is above a second predetermined level;

a first relay means for activating the heat pump when the temperature of the heat exchange fluid in the storage tank is below the first predetermined level; and means to energize the supplemental heating means when the temperature of the heat exchange fluid in the storage tank is below the first predetermined level and the indoor solar coil together with the indoor heat pump coil are not supplying sufficient heat to the enclosure.

6. The apparatus as set forth in claim 2 wherein the defrost means comprises:

a defrost thermostat in communication with the outdoor heat pump coil;

a defrost thermostat relay connected to the defrost thermostat;

a defrost timer for periodically testing to ascertain if defrost is needed;

a defrost relay connected to defrost timer contacts and defrost thermostat relay contacts for switching the means for reversing to the heating mode of operation and for energizing a supplemental heating means if the heat exchange fluid temperature in the storage tank is below the first predetermined temperature level; and a second relay means for energizing the means for circulating heat exchange fluid to supply heat exchange fluid to the indoor solar coil when the fluid in the storage tank is at an appropriate temperature level.

7. The apparatus as set forth in claim 4 wherein the off peak cooling means include:

a clock for determining the appropriate hours of usage;

a third temperature sensing device to assure the heat exchange fluid in the storage is above its freezing temperature;

a fourth temperature sensing device to prevent off peak cooling operation if the heat exchange fluid in the storage tank is already heated above a third predetermined level; and a fifth temperature sensing device for energizing the means for circulating the heat exchange fluid to supply heat exchange fluid to the indoor solar coil when the temperature of the fluid within the storage tank is below a fourth predetermined level such that relatively cool fluid is supplied to the indoor solar heat exchanger.

8. The apparatus as set forth in claim 1 wherein the indoor solar heat exchanger and the indoor heat pump heat exchanger are two separate flow paths within a single heat exchanger and are in heat transfer relationship with each other.

9. A control scheme for a solar assisted heat pump system for heating and cooling an enclosure having a thermostat in communication with the air of the enclosure which comprises:

a solar heating system for heating a heat exchange fluid within solar collectors, a storage tank and an indoor solar coil;

a heat pump system for circulating a refrigerant within an indoor heat pump coil, an outdoor heat pump coil, a compressor and means for reversing the flow of refrigerant through the heat pump coil;

circulation means for circulating the heat exchange fluid between the indoor solar coil, the fluid storage tank and the solar collector;

supplemental heating means;

heating means for supplying heat on demand from the thermostat to the enclosure from either the indoor solar coil, the supplemental heating means, the indoor heat pump coil or a combination thereof;

cooling means for removing heat from the enclosure upon demand from the thermostat;

defrost means for supplying heat to the outdoor heat pump coil by operating the heat pump in the cooling mode of operation, the indoor solar coil being used to supply heat to the indoor heat pump coil under the appropriate temperature conditions;

freeze protector means for operating the circulation means to circulate heat exchange fluid through the indoor solar coil to prevent ice from forming within the indoor solar coil;

contact means located to prevent the supplemental heating means from being operated when the heat exchange fluid in the storage tank contains sufficient heat to supply the enclosure; and temperature differential means for operating the circulation means to circulate heat exchange fluid between the solar collectors in the storage tank when the heat exchange fluid in the collectors is warmer than the heat exchange fluid in the storage tank.

10. The apparatus as set forth in claim 9 and further including:

off peak cooling means for cooling the heat exchange fluid in the indoor solar coil with the heat pump system and for storing the cooled fluid in the fluid storage tank.

11. The apparatus as set forth in claim 9 wherein the heating means includes:

a first temperature sensing device for activating the circulation means to supply heat exchange fluid to the indoor solar coil when the temperature of the heat exchange fluid in the storage tank is above the first predetermined level;

a second temperature sensing device for activating the circulation means to supply heat exchange fluid to the indoor solar coil when the temperature of the heat exchange fluid in the storage tank is above a second predetermined level;

a first relay means for activating the heat pump system when the temperature of the heat exchange fluid in the tank is below the first predetermined level; and means to operate the supplemental heating means when the temperature of the heat exchange fluid in the tank is below the first predetermined level and the indoor solar coil and indoor heat pump coil are not supplying sufficient heat to the enclosure.

12. The apparatus as set forth in claim 9 wherein the defrost means comprises:

a defrost thermostat in communication with the outdoor heat pump coil;

a defrost thermostat relay connected to the defrost thermostat;

a defrost timer for periodically testing to ascertain if defrost is needed;

a defrost relay connected to defrost timer contacts and defrost thermostat relay contacts for placing the means for reversing the heat pump in the heating mode of operation and for energizing the supplemental heating means if the fluid temperature in the storage tank is below the first predetermined level; and a second relay means for energizing the circulation means to supply heat exchange fluid to the indoor solar coil when the heat exchange fluid in the storage tank is at an appropriate temperature level to supply heated fluid to the indoor solar coil.

13. The apparatus as set forth in claim 10 wherein the off peak cooling means includes:

timing means for determining the appropriate hours of usage;

a third temperature sensing device to assure the heat exchange fluid in the storage tank is above freezing;

a fourth temperature sensing device to prevent off peak cooling operation if the heat exchange fluid in the storage tank is already heated above a third predetermined level; and a fifth temperature sensing device for energizing the circulation means to supply heat exchange fluid to the indoor solar coil when the temperature of the fluid within the storage tank is below a fourth predetermined level such that the relatively cool fluid is supplied to the indoor solar heat exchanger.

14. The apparatus as set forth in claim 9 wherein the indoor solar heat exchanger and the indoor heat pump heat exchanger are two separate flow paths within a single heat exchanger and are in heat transfer relationship with each other.

15. A method of controlling the operation of a combination solar heat pump system for conditioning an enclosure having solar collectors, a storage tank, an indoor solar heat exchanger, a heat pump with reversing means, a compressor, an indoor heat pump exchanger, and an outdoor heat pump heat exchanger and a thermostat which comprises the steps of:

pumping a heat exchange fluid between the storage tank and the indoor solar heat exchanger to transfer heat energy between the enclosure and the storage tank;

circulating the heat exchange fluid between the solar collectors and the storage tank to transfer heat from the collectors to the tank when a predetermined temperature differential is sensed;

selecting upon a thermostat demand for heating either indoor solar heat exchanger operation, indoor heat pump heat exchanger operation or a combination thereof;

energizing cooling means to remove heat from the enclosure upon the appropriate thermostat demand;

defrosting the outdoor heat exchanger by operating the heat pump in the cooling mode of operation, heat being supplied to the indoor heat pump heat exchanger from the indoor solar heat exchanger depending upon the temperature level of the heat exchange fluid in the storage tank; and sensing the temperature of the heat exchange fluid in the indoor solar heat exchanger to commence the step of pumping when the temperature level of the heat exchange fluid nears its freezing temperature.

16. The method as set forth in claim 15 and further including the step of supplying supplemental heating means wherein the step of selecting includes selecting supplemental heating means operation either solely or in combination with at least one other source of heat to the enclosure, and wherein the step of defrosting includes supplying heat to the indoor heat pump heat exchanger coil be energizing the supplemental heating means and further including the step of locking out the supplemental heating means when the temperature of the fluid in the storage tank is above a first predetermined level.

17. The method as set forth in claim 15 and further including the step of:

cooling the heat exchange fluid in the storage tank during off peak hours to collect a quantity of fluid capable of absorbing heat to satisfy cooling loads.

18. The method as set forth in claim 16 wherein the step of selecting includes:

energizing the step of pumping to provide heated heat exchange fluid to the indoor solar heat exchanger if the temperature of the heat exchange fluid in the storage tank is above a first predetermined temperature level;

activating both the step of pumping and the heat pump system in the heating mode of operation if the temperature of the fluid of the tank is below the first predetermined level and above a second predetermined level;

commencing heat pump system operation in the heating mode if the temperature of the heat exchange fluid in the storage tank is below the second predetermined level; and engaging supplemental heating means if the thermostat calls for second stage heating because the other heating methods are unable to meet the load on the enclosure and the fluid temperature in the tank is below the first predetermined temperature level.

19. A method as set forth in claim 16 wherein the step of defrosting includes:

energizing a defrost thermostat relay when a defrost thermostat senses ice on the outdoor heat exchanger;

activating a defrost relay at periodic intervals, said defrost relay energizing the reversing means and the supplemental heating means if the temperature in the storage tank is below a first predetermined level; and commencing the step of selecting for providing heat to the indoor heat pump heat exchanger for use by the heat pump in melting the ice in the outdoor heat exchanger.

20. The method as set forth in claim 15 and further including:

placing the indoor heat pump heat exchanger in heat exchange relationship with the indoor solar heat exchanger by providing two fluid circuits within one plate fin heat exchanger.

21. The method as set forth in claim 15 and further including the step of:

separating by relay means the appropriate modes of operation between the modes for the step of selecting in the heating operation and the modes for the step of energizing in the cooling operation.

22. The method as set forth in claim 21 and further including the step of:

preventing the step of separating from allowing operation in the cooling mode during defrost.

* * * * *